United States Patent [19]
Naka et al.

[11] Patent Number: 5,383,946
[45] Date of Patent: Jan. 24, 1995

[54] OPTICAL FIBER PRODUCTION METHOD AND PRODUCTION APPARATUS THEREOF

[75] Inventors: Yasuhiro Naka, Ichihara; Yukio Komura, Chiba, both of Japan

[73] Assignee: The Furukawa Electric Co., Ltd., Tokyo, Japan

[21] Appl. No.: 76,963

[22] Filed: Jun. 16, 1993

[30] Foreign Application Priority Data

Jun. 24, 1992 [JP] Japan .................................. 4-165921
Jul. 7, 1992 [JP] Japan .................................. 4-179705

[51] Int. Cl.$^6$ ........................................ C03B 37/023
[52] U.S. Cl. ........................................ 65/443; 65/475
[58] Field of Search .................... 65/3.11, 3.12, 12, 13, 65/3.1

[56] References Cited

U.S. PATENT DOCUMENTS

| | | | |
|---|---|---|---|
| 5,152,817 | 10/1992 | Bennett et al. | 65/3.1 |
| 5,160,359 | 11/1992 | Strackenbrock et al. | 65/3.12 |
| 5,256,177 | 10/1993 | Bennett et al. | 65/3.11 |

FOREIGN PATENT DOCUMENTS

| | | |
|---|---|---|
| 0261856 | 3/1988 | European Pat. Off. . |
| 0312081 | 4/1989 | European Pat. Off. . |
| 3831077 | 3/1990 | Germany . |
| 4017354 | 12/1991 | Germany . |
| 53-125857 | 11/1978 | Japan . |
| 60-65747 | 4/1985 | Japan . |
| 1-208345 | 8/1989 | Japan . |
| 2-188451 | 7/1990 | Japan . |

OTHER PUBLICATIONS

PCT International Publication No. WO89/02420, International Publication Date Mar. 23, 1989.
Patent Abstract of Japan-JP2188451, published Oct. 4, 1990.
Patent Abstract of Japan-JP60065747, published Aug. 13, 1985.
Patent Abstract of Japan-JP2153848, published Apr. 4, 1990.

*Primary Examiner*—Robert L. Lindsay
*Attorney, Agent, or Firm*—Staas & Halsey

[57] ABSTRACT

In a heating furnace an optical fiber preform is heated and the optical fiber is drawn. The obtained optical fiber is cooled by a cooling gas in a cooling apparatus provided beneath the heating furnace, then a resin is coated on the outer circumference of this optical fiber by a resin coater. At this time, the blowing direction of the cooling gas blown out from the optical fiber inlet of the cooling apparatus is inclined exactly by a predetermined angle ($\theta$) with respect to the axial line of the running optical fiber. As a result, even if no rise suppression gas is used, it is possible to prevent the cooling gas blown upward from the cooling apparatus from entering into the heating furnace and thereby to prevent the lowering of the quality of the optical fiber due to the adhesion of dust. Also, a cooling apparatus container enclosing the cooling apparatus is provided.

26 Claims, 10 Drawing Sheets

FIG. 1
FIG. 2
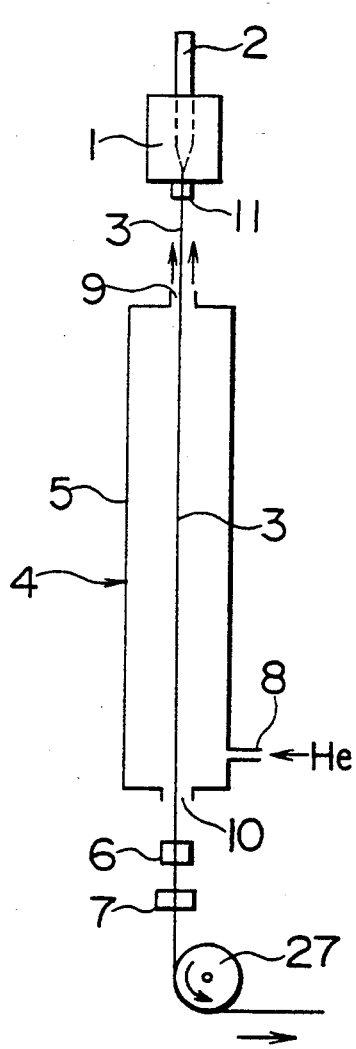
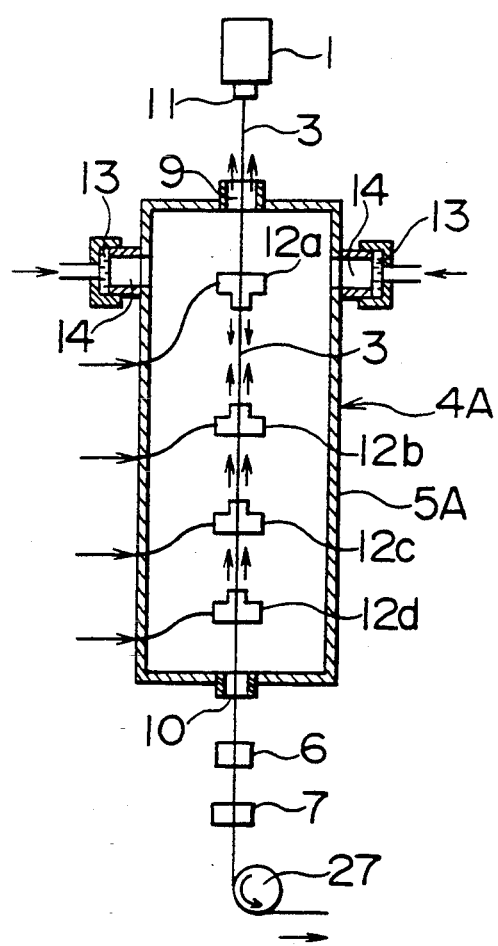
FIG. 3
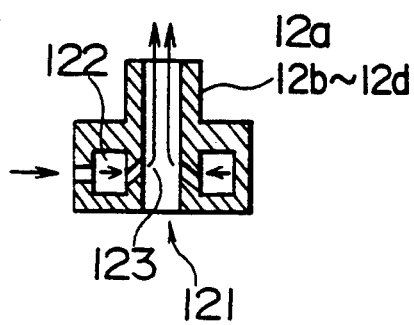

FIG. 12
FIG. 13
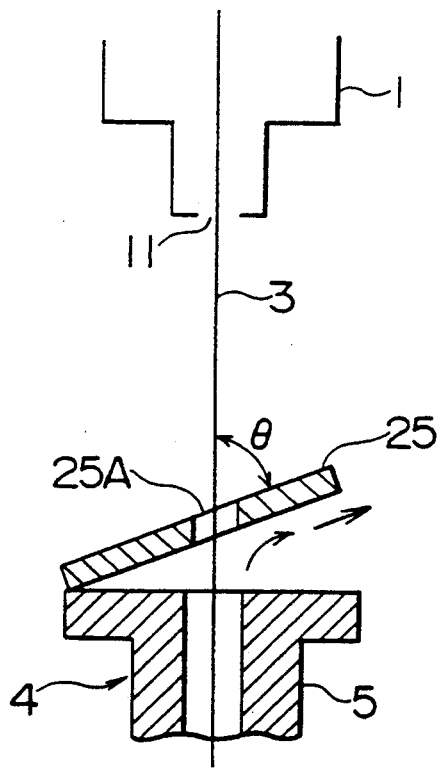
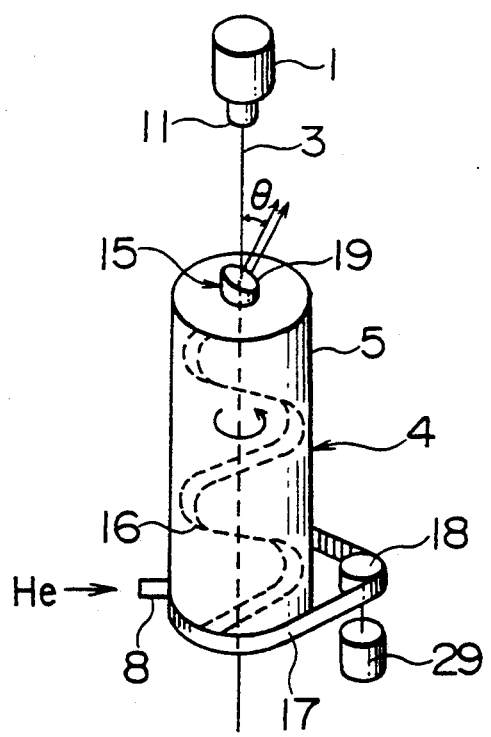

OPTICAL FIBER PRODUCTION METHOD AND PRODUCTION APPARATUS THEREOF

BACKGROUND OF THE INVENTION

1. Field of the Invention

The present invention relates to an optical fiber production method and an optical fiber production apparatus, more particularly relates to an optical fiber production method which cools the optical fiber drawn from an optical fiber preform inside a heating furnace by a cooling gas by a cooling apparatus arranged beneath the heating furnace and then coats a resin on that optical fiber, and a production apparatus for the same.

2. Description of the Related Art

An optical fiber is formed by heating an optical fiber preform in a heating furnace and then drawing the same. For example, a single mode optical fiber is formed by a core having a diameter of 10 $\mu$m at the center and a cladding having a diameter of 125 $\mu$m the same. A coating of a protective resin is provided on the optical fiber drawn in the heating furnace on the surface circumference thereof by a resin coater positioned beneath the heating furnace.

The optical fiber immediately after it is drawn in the heating furnace and pulled out has a high temperature, for example, about 800° C. When a protective resin is to be coated on an optical fiber which in such a high temperature state by a resin coater, the viscosity of the protective resin is increased by the heating, and therefore the protective resin cannot be coated well on the optical fiber. Therefore, the optical fiber has been force-cooled to a predetermined temperature after the optical fiber is drawn in the heating furnace and before the resin is coated on the optical fiber by the resin coater.

Japanese Unexamined Published Patent Application (Kokai) No. 53(1978)-125857 (hereinafter referred to as JPP 53(1978)-125857, same below) discloses a method of force-cooling the optical fiber by blowing air from a plurality of injection ports in a direction orthogonal to a running direction of the optical fiber. In this method, the cooling is insufficient if only one injection port is provided for cooling, therefore it is necessary to provide multiple injection ports for cooling. As a result, the cooling apparatus becomes complex, and consequently there is the problem that the optical fiber production apparatus is enlarged in size, and thus the apparatus production cost becomes high. Also, this method suffers from the problem that the dimension of the cooling apparatus in a direction orthogonal to the running direction of the optical fiber, that is, the dimension in the diameter direction of the cooling apparatus, becomes large. Further, in this method, a means of releasing the cooling air after the cooling to the outside of the cooling apparatus is needed. When the cooling air is released to the heating furnace side above the cooling apparatus, the cooling air enters into the heating furnace, resulting in a problem that the quality of the optical fiber is lowered. A detailed explanation of the problem of the cooling air entering into the heating furnace and the quality of the optical fiber being lowered will be given later as another conventional example using the figures.

JPP 60(1985)-65747 discloses as a method of force-cooling the optical fiber after the drawing in the heating furnace a method of generating a vortex flow of the cooling medium on the outer circumference of the optical fiber by using the cooling medium, cooling the optical fiber by the vortex flow of this cooling medium, and, at the same time, holding the running optical fiber by this vortex flow. In this method too, however, there is a problem that the cooling medium enters into the heating furnace above the cooling unit, to lower the quality of the optical fiber in the heating furnace. Further, in this method, there is a problem that the construction for generating the vortex flow is complex, and the construction of the cooling apparatus becomes complex.

JPP 1(1990)-208345 and JPP 2(1991)-188451 disclose a method of providing a gas cooling tube, spirally perforated toward the optical fiber, so as to enclose the periphery of the optical fiber drawn in the heating furnace, introducing the cooling gas to this cooling tube from the lower portion toward the upper portion, blowing the cooling gas from the holes of the cooling tube to the optical fiber, and thereby cooling the optical fiber. In this method too, however, since provision is made of the gas cooling tube spirally perforated toward the optical fiber, the construction of the cooling apparatus is complex and further there is a problem that the flow rate of the gas introduced into the gas cooling tube must be exactly controlled so as to uniformly cool the optical fiber, and so the control operation thereof becomes complex.

As mentioned above, force-cooling becomes necessary to coat the optical fiber drawn in the heating furnace by a protective resin, but such force-cooling has the problem that the quality of the optical fiber is lowered as mentioned above and as will be explained in detail below referring to the figures. A detailed explanation of another conventional optical fiber cooling method causing the problem of a lowering of the quality of the optical fiber due to the cooling gas flowing out from the cooling apparatus entering into the above-mentioned heating furnace will be given below as well.

FIG. 1 is a structural view of an optical fiber production apparatus having a cooling apparatus 4 for performing force-cooling using helium (He) gas, which has a good heat conductivity, as the cooling gas. The lower portion of the optical fiber preform 2 is heated to melt inside the heating furnace 1, and the optical fiber 3 is drawn from the heated and melted portion of the optical fiber preform 2. The obtained drawn optical fiber 3 is pulled out from the optical fiber exit 11 at the bottom and introduced into a cooling tubular body 5 of the cooling apparatus 4 provided downstream of the heating furnace 1. After the optical fiber 3 is force-cooled by the He gas in the cooling tubular body 5, the optical fiber 3 is passed through the resin coater 6 provided below the cooling apparatus 4 to coat a protective resin on the same. Further, the resin coated on the optical fiber 3 is cured by a resin curer 7, the orientation of the optical fiber is changed via a turn roll (or a turn sheave) 27, and the optical fiber coated by the resin is taken up by a takeup machine (not illustrated) provided further on. For example, where the drawing rate is 300 m/min, the He gas flows inside the cooling tubular body 5 at about 10 l/min, to force-cool the optical fiber 3. Since He gas is light, usually the He gas is injected from the cooling gas injecting port 8 at the lower portion of the cooling tubular body 5 and blown out from the optical fiber inlet 9 at the upper portion of the cooling tubular body 5.

In the optical fiber production apparatus shown in FIG. 1 using He gas as the cooling gas, since the mass of He gas is small and also the diffusion coefficient is large, even if the He gas is introduced into the cooling tubular body 5, the amount of the He gas leaked from the optical fiber inlet 9, which serves as the hole for passage of the optical fiber, at the top of the cooling tubular body 5 is large. The amount of the He gas to be introduced into the cooling tubular body 5 is about 10 l/min where the drawing rate is 300 m/min, and the concentration of the He gas inside the cooling tubular body 5 is always a concentration of 50 percent or less, and therefore there arises a problem that the air in the outside environment invades the cooling tubular body 5, the dust floating in the air comes into contact with the optical fiber 3 before the coating of the resin, scratches are formed in the optical fiber 3, or the like, so the optical fiber 3 breaks by a tensile force of an average strength of 6 kg or less.

Originally, so as to fill the He gas in the cooling tubular body 5, preferably no port for release of the He gas is provided, but to pass the optical fiber 3 through the cooling apparatus 4, it is necessary to provide the optical fiber inlet 9 and the optical fiber exit 10 having a diameter of about 10 mm at the upper portion and lower portion of the cooling tubular body 5. Where the drawing rate is 300 m/min and the He gas has a small flow rate, for example, about 10 l/min, the flow rate of the He gas blown out from the optical fiber inlet 9 is about 2 m/sec. However, a recent tendency has been to raise the drawing rate from 300 m/min to about 600 m/min, which is the twice the former, so as to enhance the productivity of the optical fiber. In that case, to enhance the cooling capability of the optical fiber 3, it is necessary to pass also He gas in the cooling tubular body 5 at a rate of about two times, for example 20 l/min, and He gas at a high speed of about 4 m/sec is blown from the optical fiber inlet 9 directly above the cooling tubular body 5. Where a large amount of He gas is blown out from the optical fiber inlet 9 to the area above it, the cooling He gas enters from the optical fiber exit 11 of the heating furnace 1, positioned above the optical fiber inlet 9, into the heating furnace 1 while the high speed He gas flow entrains the air at the periphery. An inert gas is filled in the heating furnace 1, but there arises a problem that the dust in the air invades the heating furnace 1, or the heating furnace material is burned by the entering gas to generate dust, and that dust adheres to the optical fiber 3 in a stage where it is formed as a core and cladding by the heating and melting inside the heating furnace 1. This damages the optical fiber 3 and lowers the strength of the optical fiber 3. That is, where the drawing rate is doubled in this way, the amount of supply of the He gas to the cooling tubular body 5, i.e., 10 l/min also doubles, and also the entraining flow of the air becomes about double, and therefore the probability of adhesion of dust to the optical fiber 3 doubles and the probability of breakage of the optical fiber 3 becomes two times or more.

FIG. 2 is a structural view of an optical fiber production apparatus for performing the drawing of an optical fiber accompanied with the conventional force-cooling using air as the cooling medium. This optical fiber production apparatus uses an inexpensive gas in place of the expensive He gas as the cooling medium, and therefore has an advantage in view of price in comparison with the optical fiber production apparatus shown in FIG. 1.

In FIG. 2, a cooling apparatus &A is provided between a heating furnace 1 and a resin coater 6, gas blowing nozzles 12a to 12d each having a structure illustrated in FIG. 3 are arranged in a plurality of stages inside the cooling tubular body 5A of this cooling apparatus 4A, and the cooling air after cleaned of dust is blown out from these gas blowing nozzles 12a to 12d to the optical fiber 3 at a high speed, to force-cool the optical fiber 3. That is, the gas blowing nozzles 12a to 12d are arranged in a plurality of stages vertically along the passage of the optical fiber 3 inside the cooling tubular body 5A of the cooling apparatus 4A. Clean air is blown out from these cooling gas blowing nozzles as the cooling gas to the optical fiber 3 at a high speed to cool the same. Among the plurality of stages of gas blowing nozzles 12a to 12d, the gas blowing nozzle 12a at the topmost stage blows out the cooling gas downward inside the cooling tubular body 5A. Note that, in the cooling tubular body 5A, other than the optical fiber 3 being cooled by the gas blowing nozzles 12a to 12d, clean air flows in from the gas feed ports 14 on the left and right in the upper portion of the optical tubular body 5A via a filter 13, to prevent the adhesion of the dust to the optical fiber 3.

Also, in an optical fiber production apparatus having a cooling apparatus 4A shown in FIG. 2, an optical fiber inlet 9 and an optical fiber exit 10 are provided at the top portion and bottom portion of the cooling tubular body 5A so as to pass the optical fiber 3, and therefore the air is blown out directly upward from the optical fiber inlet 9 at a high speed and goes toward the heating furnace 1. If the gas blowing nozzle 12a at the topmost stage is oriented upward inverse from the illustration, a larger amount of air is naturally blown out from the optical fiber inlet 9 to the heating furnace i just above the same and enters into the heating furnace i via the optical fiber exit 11 of the heating furnace. For example, when clean air is introduced from the gas feed port 14 to the inside of the cooling tubular body 5A via the filter 13 at a rate of about 2 m$^3$/min, the differential pressure between the inside and outside of the cooling tubular body 5A becomes about 1 mmH$_2$O, and therefore if the inner diameter of the optical fiber inlet 9 is about 10 mm, the air is blown out from the optical fiber inlet 9 at about 20 l/min. The gas flow rate of the air flowing out from the optical fiber inlet 9 at this time becomes about 4 m/sec. Also this air entrains the air containing dust at the outside of the heating furnace 1, enters into the heating furnace i from the optical fiber exit 11, and induces the same problems as mentioned referring to FIG. 1.

That is, in both of the optical fiber production apparatus illustrated in FIG. 1 and the optical fiber production apparatus illustrated in FIG. 2, when the drawing rate of the optical fiber 3 is set to 300 m/min or more, for example, about 600 m/min, so as to improve the productivity of the optical fiber, the cooling ability by the cooling gas must be raised so as to cool the optical fiber 3 in a shorter time. For this purpose, it is necessary to make the distance between the heating furnace 1 and the cooling apparatus 4 shown in FIG. 1 and the distance between the heating furnace i and the cooling apparatus 4A shown in FIG. 2 as short as possible, to ensure a long cooling section. A shorter cooling interval is convenient in terms of the reduction of size of the optical fiber production apparatus. However, when the cooling interval is made short, the flow rate of the cooling gas which is exhausted from the cooling apparatus 4 or the cooling apparatus 4A and rises toward the heating furnace 1, that is, the He gas or air, is not lowered that much and entrains the air containing dust at the periphery. This cooling gas enters into the heating furnace 1, to cause a problem of deterioration of the strength of the optical fiber 3 as mentioned previously.

With respect to this, as shown in FIG. 4, for example, in the optical fiber production apparatus illustrated in FIG. 2, a proposal has been made that a rise suppression gas be blown out from the optical fiber inlet 9 of the cooling tubular body 5A downward into the cooling tubular body 5A to suppress the cooling gas which is blown out from the optical fiber inlet 9 at the upper portion of the cooling tubular body 5A and rises toward the heating furnace 1. However, such a method involves a problem that it is necessary to blow downward the rise suppression gas in an amount approximately the same as that of the cooling gas from the optical fiber inlet 9 of the cooling apparatus 4A and therefore useless gas consumption occurs.

Note that, in the optical fiber production method of the optical fiber production apparatus shown in FIG. 2 using air as the cooling gas, the air has a lower cooling capability than He gas and therefore a higher speed flow of cooling air flow is formed compared with the He gas. This also entrains the air at the periphery of the optical fiber 3 inside the cooling tubular body 5A when performing the cooling, and thus the amount of entrainment of the air containing dust of the surroundings after flowing out from the optical fiber inlet 9 becomes larger. This air containing dust enters into the heating furnace 1, resulting in a problem that the probability of breakage of the optical fiber 3 due to the contact with dust becomes larger. For example, where the flow rate of the cooling air is about 20 m/sec, the probability of contact of the dust becomes 5 times or more greater in comparison with the case where He gas flows.

Where cooling air is blown out to the periphery of the optical fiber 3 to cool the same, the level of dust of the environment (the periphery of the cooling apparatus) and the probability of the breakage of the optical fiber 3, that is, the number of times of breakage per unit length where 1 percent elongation is applied to the optical fiber 3 by screening has a correlative relationship as shown in, for example, FIG. 5. Where a long length, for example, 100 km or more, of an optical fiber 3 is to be produced as in recent years, the probability of breakage of the optical fiber 3 must be reduced to 0.01 break/km or less. For this purpose, an environment of a degree of cleanness of class 1000 or better is needed, and the manufacturing cost of the cooling apparatus and consequently the manufacturing cost of the optical fiber production apparatus becomes higher.

In this regard, it has also been considered to place the entire optical fiber production apparatus in a clean environment, but an optical fiber production apparatus has a total length of a long as 10 m or more, and the facility cost becomes further higher when placing an entire optical fiber production apparatus in a clean environment. Also, the running cost of the optical fiber production apparatus becomes higher. Therefore, this is not practical.

SUMMARY OF THE INVENTION

An object of the present invention is to provide an optical fiber production method and an optical fiber production apparatus which can prevent the optical fiber cooling gas blown out upward from the cooling apparatus from entraining air containing dust at the periphery and from entering into the heating furnace even if a rise suppression gas or the like is not used.

Another object of the present invention is to provide an optical fiber production method and an optical fiber production apparatus with which the probability of breakage of the optical fiber can be lowered without causing a great rise in the costs.

According to the present invention, there is provided an optical fiber production method in which an optical fiber is drawn from an optical fiber preform in a heating furnace, the obtained optical fiber is cooled by a cooling gas in a cooling apparatus provided beneath the aforesaid heating furnace, and then a resin is coated on the optical fiber in a resin coating device, wherein the orientation of the blowing of cooling gas of the optical fiber penetration hole formed at the top portion of the aforesaid cooling apparatus is set to an orientation different from that of the axial line of the aforesaid running optical fiber, to prevent the cooling gas flowing out from the aforesaid optical fiber penetration hole from entering into the aforesaid heating furnace. Accordingly, no lowering of quality of the optical fiber in the heating furnace occurs. Also, in the present invention, the rise suppression gas mentioned as the conventional technique is not needed.

The optical fiber production apparatus for working the above-mentioned optical fiber production method of the present invention includes: a heating furnace for heating the optical fiber preform and drawing an optical fiber comprising a core and cladding; a cooling apparatus having a first optical fiber penetration portion which is arranged beneath the heating furnace and receives the optical fiber drawn from the aforesaid heating furnace, a cooling means which force-cools the received optical fiber by using the cooling gas, and a second optical fiber penetration portion from which the cooled optical fiber is pulled out; and a resin coating means which is arranged downstream of the cooling apparatus and coats a protective resin on the aforesaid optical fiber which was cooled and pulled out from the aforesaid second optical fiber penetration portion, wherein a cooling gas flow louver (direction) means which directs the aforesaid cooling gas blown out from the first optical fiber penetration portion to a predetermined angle relative to the running axis of the optical fiber is provided at the aforesaid first optical fiber penetration portion.

Preferably, the aforesaid cooling gas louver means has a hole with an equal size to that of the aforesaid first optical fiber penetration hole positioned at the top of the aforesaid cooling means and forms a hole with an orientation different from that of the running axis of the aforesaid optical fiber.

More preferably, the aforesaid cooling gas louver means is provided with a gas holder which accumulates the aforesaid blown out cooling gas, between the aforesaid first optical fiber penetration hole positioned at the top of the aforesaid cooling means and the hole of the aforesaid cooling gas louver means.

Specifically, the aforesaid cooling gas louver means has a flange which has a hole substantially the same size as that of the aforesaid first optical fiber penetration hole positioned at the top portion of the aforesaid cooling means, a tubular portion which is connected to the flange, has a larger inner diameter than the inner diameter of the flange, and defines the aforesaid gas holder, and a nozzle member which has a hole in the surface orthogonal to the running axis of the aforesaid optical fiber with an equal size to that of the hole at the top of the aforesaid cooling means, the surface of which is inclined at the aforesaid predetermined angle with respect to the running axis of the aforesaid optical fiber.

Also, specifically, the aforesaid cooling gas louver means has a flange which has a hole substantially the same size as that of the aforesaid first optical fiber penetration hole positioned at the top portion of the aforesaid cooling means, a tubular portion which is connected to the flange, has a larger inner diameter than the inner diameter of the flange, and defines the aforesaid gas holder, and a tubular nozzle member which is connected to the tubular portion, formed to have a tubular shape having a predetermined length, the direction of the tube being inclined exactly to the aforesaid predetermined angle with respect to the running axis of the aforesaid optical fiber, and the hole of that tube being formed to have a size with which the aforesaid optical fiber can run in the interior thereof.

Further specifically, the aforesaid cooling gas louver means has a plate-like member in which is formed a hole large enough to allow the aforesaid optical fiber to pass therethrough and which is provided at the top of the aforesaid cooling means with an inclination of exactly a predetermined angle with respect to the running axis of the aforesaid optical fiber and, further, the aforesaid blown out cooling gas is steered along the bottom surface of the plate-like member.

Specifically, the internal portion of the aforesaid cooling means is constituted to have a tubular shape having an inner cavity large enough to allow the aforesaid optical fiber to run in the interior of the same and so that the aforesaid cooling gas flow from the lower portion to the upper portion in the inner cavity. The aforesaid cooling gas louver means has a hole having a size equal to that of the aforesaid first optical fiber penetration hole corresponding to the top of the inner cavity of the aforesaid cooling means, and the hole is formed so that the orientation thereof is an orientation different from the running axis of the aforesaid optical fiber.

Also, preferably, the aforesaid cooling apparatus has, at the periphery of the running axis of the optical fiber, a fin spirally arranged in the aforesaid cooling means along the running axis of the optical fiber, a cooling means accommodating the fin, and a means for rotating the cooling means.

Specifically, the aforesaid cooling means has a plurality of cooling gas blowing nozzles through the centers of which the aforesaid optical fiber passes, which blow out the cooling gas so as to cool the aforesaid optical fiber at the stage where it passes and which are arranged in multiple stages along the running axis of the optical fiber.

More specifically, among the aforesaid plurality of stages of gas blowing nozzles, the orientation of blowing of the cooling gas blowing nozzle in the vicinity of the aforesaid first optical fiber penetration hole is set to be inverse to that of the first optical fiber penetration hole, and the orientation of blowing of the other cooling gas blowing nozzles is set be inverse to the orientation of running of the aforesaid optical fiber. The aforesaid cooling apparatus has a cooling container which accommodates the gas blowing nozzles, has the aforesaid first optical fiber penetration hole formed at the top thereof, and has the aforesaid second optical fiber penetration hole formed at the bottom thereof, and an air sealing means which seals clean air from above the cooling container to the inside of the cooling container. The aforesaid cooling gas louver means is provided in the part of the aforesaid first optical fiber penetration hole.

Also, specifically, the orientation of the aforesaid plurality of stages of cooling gas blowing nozzles is set to be inverse to the orientation of the running of the aforesaid optical fiber. Among these cooling gas blowing nozzles, the orientation of the gas blowing nozzle in the vicinity of the aforesaid first optical fiber penetration hole is one inclined exactly a predetermined angle with respect to the running axis of the optical fiber.

Also, according to the present invention, there is provided an optical fiber production method characterized in that the blowing orientation of cooling gas of the aforesaid first optical fiber penetration hole formed at the top of the aforesaid cooling apparatus is set to be different from the orientation of the axial line of the aforesaid running optical fiber and, at the same time, the periphery of the aforesaid cooling apparatus is maintained at a positive pressure with respect to the outside environment by a positive pressure forming gas from which the dust has been removed, the cooling of the aforesaid optical fiber being carried out by the aforesaid cooling gas.

The optical fiber production apparatus for working this method preferably has a cooling means container, which encloses the aforesaid cooling means and has an optical fiber passing hole having almost the same diameter as that of the inner cavity at both ends of the inner cavity of the aforesaid cooling means corresponding to the two ends, and a gas injection means which injects positive pressure gas into a space between the cooling apparatus means container and the aforesaid cooling means.

Preferably, the gas injected by the aforesaid gas injection means is the air in the ambient atmosphere, and the aforesaid gas injection means has a filter for cleaning the air.

Specifically, the aforesaid cooling apparatus has a cooling means container which encloses a plurality of cooling gas blowing nozzles and has optical fiber passing holes at the top and bottom thereof and a gas injection means which injects positive pressure gas into a space between the cooling apparatus means container and the aforesaid cooling means.

Preferably, the cooling apparatus container which encloses the aforesaid cooling apparatus is provided in the optical fiber production apparatus, and the aforesaid positive pressure forming gas is sealed in the cooling apparatus container.

Further, according to the present invention, there is provided an optical fiber production method comprised of sealing off the space between the aforesaid cooling apparatus and the aforesaid resin coating device from the outside air.

The optical fiber production apparatus for working this optical fiber production method has a sealing means which seals off the running part of the aforesaid optical fiber from the outside air, between the lower end of the aforesaid cooling apparatus and the aforesaid coating means.

Preferably, the aforesaid sealing means is constituted by an expandable material.

BRIEF DESCRIPTION OF THE DRAWINGS

The above-mentioned objects and features of the present invention and other objects and features will be further clarified by the following description in relation to the attached drawings, in which:

FIG. 1 is a structural view of a conventional optical fiber production apparatus using He gas as the cooling gas;

FIG. 2 shows a conventional optical fiber production apparatus using air as the cooling gas;

FIG. 3 is a cross-sectional view of gas blowing nozzles provided inside the cooling apparatus shown in FIG. 2 and inside the cooling apparatus of the present invention;

FIG. 12 is a view of a modified form of the gas louver;

FIG. 13 is a structural view of an optical fiber production apparatus as a fourth embodiment of the optical fiber production apparatus of the present invention;

DESCRIPTION OF THE PREFERRED EMBODIMENTS

Figure 4:
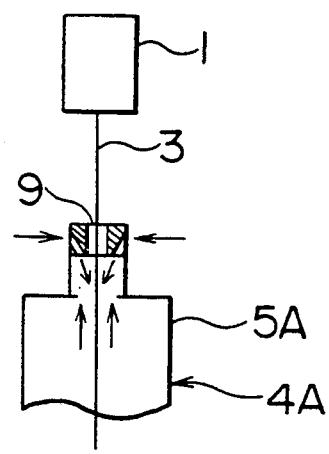
FIG. 4 is a partial structural view of another conventional optical fiber production apparatus.
Figure 5:
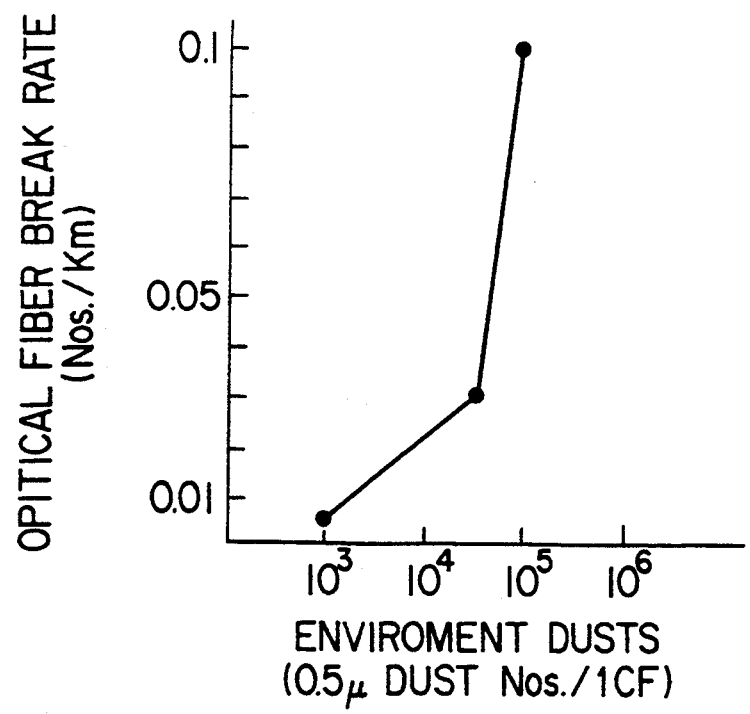
FIG. 5 is a graph showing a relationship between the probability of breakage of the optical fiber and the environmental dust.

Below, embodiments of the optical fiber production apparatus and the optical fiber production method of the present invention will be explained referring to the drawings.

Figure 6:
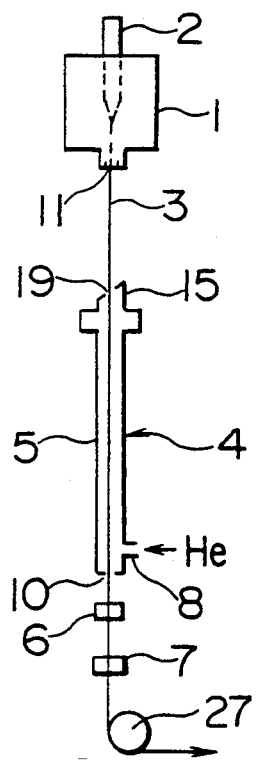
FIG. 6 is a longitudinal cross-sectional view of an optical fiber production apparatus using He gas as the cooling gas as a first embodiment of the optical fiber production apparatus based on the present invention.
Figure 7:
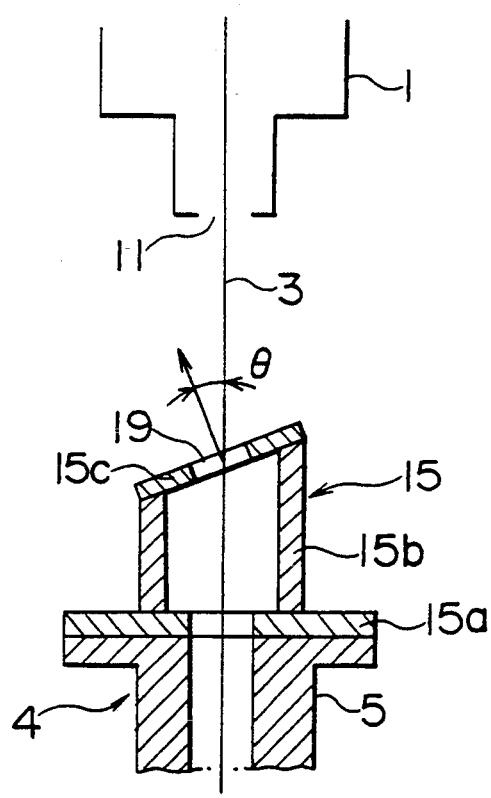
FIG. 7 is a partially enlarged view of an optical fiber production apparatus with a gas louver shown in FIG. 6 as the center.

FIG. 6 is a structural view of an optical fiber production apparatus using He gas as the cooling gas as a first embodiment of the optical fiber production apparatus of the present invention. This optical fiber production apparatus corresponds to the optical fiber production apparatus shown in FIG. I as the conventional optical fiber production apparatus. FIG. 7 is a partially enlarged view of the optical fiber production apparatus shown in FIG. 6.

The optical fiber production apparatus shown in FIG. 6 has a heating furnace 1, a cooling apparatus 4, a resin coater 6, a resin curer 7 which hardens resin coated on the optical fiber, and a turn roll 27. The optical fiber preform 2 is heated and drawn in the heating furnace 1 and pulled out as the optical fiber 3 from the optical fiber exit 11 of the heating furnace, then introduced from the optical fiber inlet 19 to the cooling tubular body 5 inside the cooling apparatus 4. The optical fiber 3 cooled at the cooling tubular body 5 is pulled out from the optical fiber exit 10 and introduced to the resin coater 6. Resin is coated by the resin coater 6, then the coated resin is cured by the resin curer 7 and taken up by a takeup machine (not illustrated) via the turn roll 27. He gas is introduced into the cooling tubular body 5 as the cooling gas from the cooling gas introduction port 8 at the lower portion of the cooling tubular body 5 and cools the optical fiber 3 passing through the inside of the cooling tubular body 5.

As shown in FIG. 7, a gas louver 15 which restricts the orientation of the gas blow out is provided at the upper end of the cooling tubular body 5 of the cooling apparatus 4. This gas louver 15 is constituted by a flange 15a which is connected to the upper end of the cooling tubular body 5; a tubular portion 15b which is provided connected to this flange 15a; and a plate-like nozzle member 15c attached to the upper end of this tubular portion 15b inclined with respect to the same. The nozzle member 15c is provided with the optical fiber inlet 19 while inclined exactly by a predetermined angle $\theta$ with respect to the axial line of the running optical fiber 3 and acts also as the nozzle port. Although this inclination angle $\theta$ varies according to the interval (distance) between the heating furnace 1 and the cooling apparatus 4, it is sufficient if it is a value whereby the flow rate of the gas exhausted from the optical fiber inlet 19 becomes zero at the optical fiber exit 11 of the heating furnace 1. In this embodiment, when the distance between the heating furnace 1 and the cooling tubular body 5 is set to 400 mm, $\theta$ is made equal to 30°. Also, the inner diameter of the optical fiber inlet 19 is made equal to 10 to 15 mm. When setting the conditions in this way, even if for example the He gas introduced from the cooling gas introduction port 8 to the cooling tubular body 5 becomes 20 l/min or more, so that the flow rate of the gas blown out from the optical fiber inlet 19 becomes as large as about 4 m/min, the direction of blowing from the optical fiber inlet 19 of the cooling apparatus is no longer parallel to the axial line of the running optical fiber 3 and becomes the direction inclined exactly by the angle $\theta$ from the axial line of the running optical fiber 3. For this reason, the He gas which is blown out from the optical fiber inlet 19 and flows while entraining the air containing dust at the periphery of the cooling apparatus 4 does not go toward the optical fiber exit 11 of the heating furnace and does not enter into the heating furnace 1. As a result, the problem in the prior art of an increase of the breakage rate of the optical fiber 3 produced since air containing dust enters into the heating furnace 1 is solved.

As the inner diameter of the optical fiber inlet 19 at the top of the cooling tubular body 5, for example about 10 to 15 mm is adequate as such a size reduces the leakage of gas and does not bring this optical fiber 3 into contact with the optical fiber inlet 19, which occurs since an optical fiber 3 running at a high speed of about 300 to 600 m/min rocks back and forth. Note that, the optical fiber 3 has a diameter of 125 $\mu$m mentioned above. Of course, a weight of an outer diameter larger than the inner diameter of the optical fiber inlet 19 is passed as a threading weight of the optical fiber 3 through the optical fiber inlet 19 at the start of the drawing operation, and therefore it is also possible to make the size of the optical fiber inlet 19 variable so that the inner diameter of the optical fiber inlet 19 is made larger than the outer diameter of that weight at this time, and the inner diameter of the optical fiber inlet 19 becomes smaller after the passing of that weight. Also the inner diameter of the optical fiber exit 10 at the bottom of the cooling tubular body 5 is similar to the inner diameter of the optical fiber inlet 19.

To once lower the flow rate of the He gas blown out from the optical fiber inlet 19 at the top of the cooling tubular body 5, preferably the gas louver 15 is constituted so as to have an He gas holder. For this purpose, the hole of the flange 15a is set to have the same size as the inner diameter of the cooling tubular body 5, while the inner diameter of the tubular portion 15b is made larger than the inner diameter of the cooling tubular body 5. The inner diameter of the cooling tubular body 5 is substantially equal to the inner diameter of the above-mentioned optical fiber inlet 19. Due to this, a gas holder temporarily storing the He gas blown out into the inside of the tubular portion 15b is formed. The flow rate of the He gas blowing through the inside of the cooling tubular body 5 is reduced by this gas holder. Even if the nozzle member 15c is inclined exactly by the angle $\theta$ with respect to the axial line of the optical fiber 3, when the flow rate of the He gas blown out from the optical fiber inlet 19 is large, there is a possibility that a certain part of the He gas will entrain air containing dust at the periphery of the cooling apparatus 4 and reach the optical fiber exit 11 at the bottom of the heating furnace 1, but if the flow rate of the blown out He gas is lowered, the influence thereof is greatly reduced.

Note that, the shape of the optical fiber inlet 19 seen from the direction orthogonal to the nozzle member 15c can be made elliptical so that the shape thereof becomes a circle where it is projected in the direction of the running axial line of the optical fiber 3.

Figure 8:
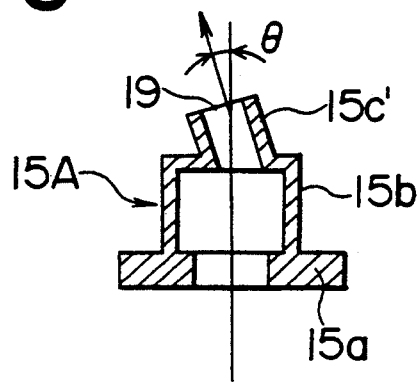
FIG. 8 is a cross-sectional view showing a modified example of the gas louver shown in FIG. 6.

FIG. 8 shows the structure of a gas louver 15A as a modified example of the gas louver 15. In this gas louver 15A, the nozzle member 15c' is formed cylindrically long to an extent up to which it does not contact the optical fiber 3. The inclination angle $\theta$ with respect to the running axial line of the optical fiber 3 is similar to that of the gas louver 15. When the nozzle member 15c' is made to have such a tubular shape, it is possible to rectify the blown out He gas by this tubular portion and to converge and exactly steer it in the direction of the angle $\theta$. That is, the gas louver 15A can change the blowing direction of the He gas flowing out from the optical fiber inlet 19 by exactly the angle $\theta$ more exactly than the gas louver 15 illustrated in FIG. 7, and thus it is possible to effectively prevent the He gas flowing out from the gas blowing nozzle 19 from entering into the heating furnace 1 via the optical fiber exit 11 of the heating furnace.

Figure 9:
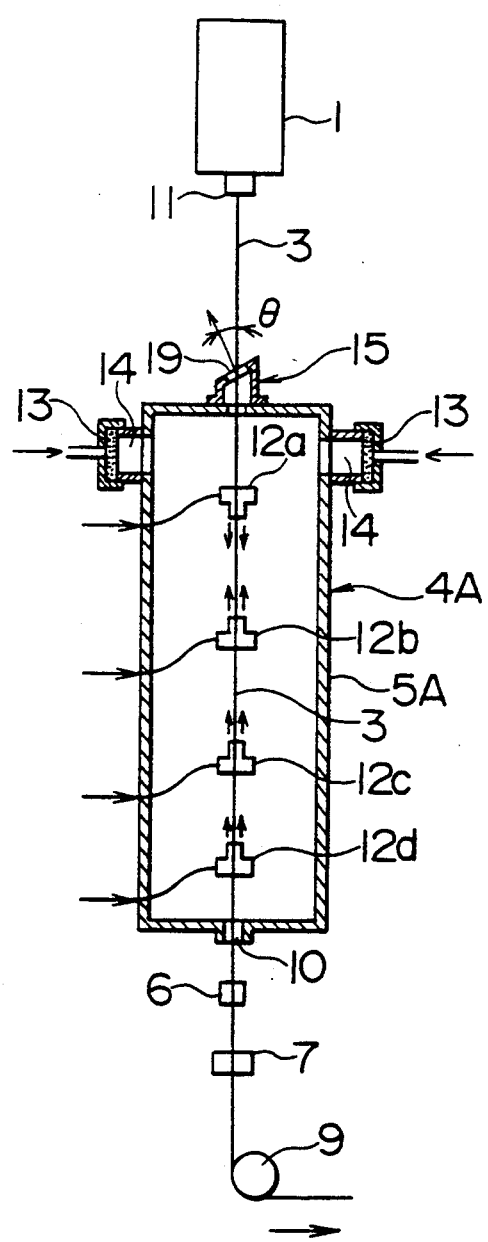
FIG. 9 is a longitudinal cross-sectional view of an optical fiber production apparatus using air as the cooling gas as a second embodiment of the optical fiber production apparatus based on the present invention.

FIG. 9 is a longitudinal cross-sectional view of an optical fiber production apparatus having a cooling apparatus 4A which uses air as the cooling gas as a second embodiment of the optical fiber production apparatus based on the present invention and is a view corresponding to FIG. 2 shown as the conventional example.

A cooling apparatus 4A having a cooling tubular body 5A is provided between the heating furnace 1 and the resin coater 6. In the cooling tubular body 5A, gas blowing nozzles 12a to 12d similar to those illustrated in FIG. 3 are arranged in multiple stages. At the upper end of the cooling tubular body 5A, a gas louver 15 and an optical fiber inlet 19 having the same constructions as those illustrated in FIG. 6 and FIG. 7 are provided.

In this optical fiber production apparatus, clean air is introduced into the cooling tubular body 5A through the filter 13 and the gas feed port 14 provided at the upper portion of the cooling tubular body 5A at a a rate of about 2 m$^3$/min. In this case, the internal pressure of the cooling tubular body 5A becomes about 2 mmH$^2$O. At this time, if the inner diameter of the optical fiber inlet 19 is about 10 mm, air having a flow rate of about 20 l/min is blown out from the optical fiber inlet 19. The flow rate of this blown out air is about 4 m/sec. Since the orientation of the optical fiber inlet 19 is one inclined by exactly the angle $\theta$ with respect to the running optical fiber 3, as mentioned previously referring to FIG. 6 and FIG. 7, the cooling air blown out from the optical fiber inlet 19 of the cooling apparatus does not enter into the heating furnace 1 via the optical fiber exit 11 of the heating furnace. This inclination angle $\theta$ varies according to the interval (distance) between the heating furnace i and the cooling apparatus 4A, but is set to a value with which the flow rate of the gas exhausted from the optical fiber inlet 19 becomes zero at the optical fiber exit 11 of the heating furnace 1.

Also, in the optical fiber production apparatus having a cooling tubular body 5A using air as cooling gas, shown in FIG. 9, it is possible to use the gas louver 15A shown in FIG. 8 in place of the above-mentioned gas louver 15. The effect of use of the gas louver 15A is similar to the above-mentioned effect.

Figure 10:
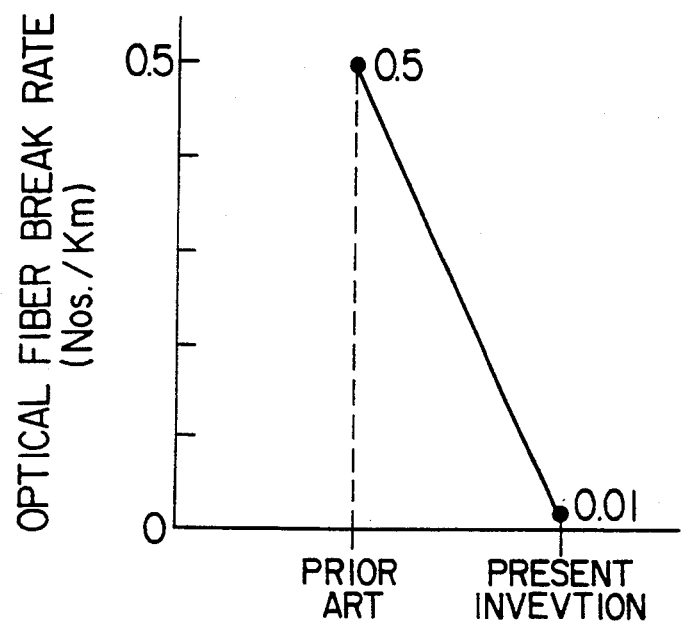
FIG. 10 is a graph indicating the probability of breakage of the optical fiber in the optical fiber production apparatus shown in FIG. 2 and the probability of breakage of the optical fiber in the optical fiber production apparatus shown in FIG. 9.

FIG. 10 is a graph showing the probability of breakage of the optical fiber in the optical fiber production apparatus shown in FIG. 2 and the probability of breakage of the optical fiber in the optical fiber production apparatus shown in FIG. 9. The breakage rate of the optical fiber indicates the result of comparative experiments of the value obtained by dividing the number of times of breakage of the optical fiber by the total length of the optical fiber in the case of a screening test imparting 1 percent elongation to the optical fiber. In any case, the flow rate of the gas exhausted from the optical fiber inlet 9 or 19 was set to the same 4 m/sec. As clear from FIG. 10, the breakage rate is 0.5 in the conventional optical fiber production apparatus shown in FIG. 2, and the breakage rate in the optical fiber production apparatus of the present invention shown in in FIG. 9 is 0.01. That is, it was clarified that, according to the present invention, the breakage rate of the optical fiber could be considerably lowered.

Figure 11:
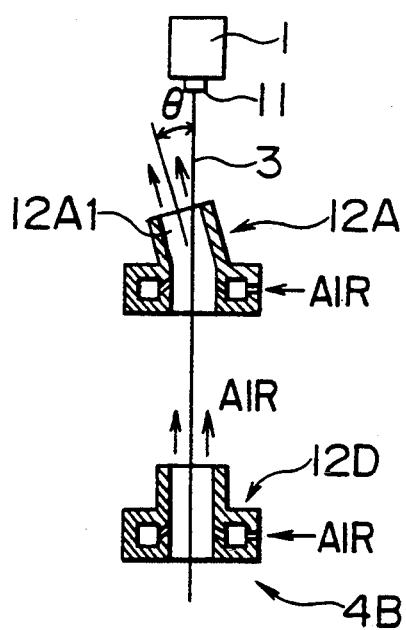
FIG. 11 is a schematic structural view of an optical fiber production apparatus as a third embodiment of the optical fiber production apparatus of the present invention.

FIG. 11 is a schematic structural view of an optical fiber production apparatus as a third embodiment of the optical fiber production apparatus of the present invention. This optical fiber production apparatus corresponds to the optical fiber production apparatus shown in FIG. 9, but with the cooling tubular body 5A deleted. That is, in this optical fiber production apparatus, the cooling tubular body 5A enclosing the gas blowing nozzles 12a to 12d shown in FIG. 9 is deleted, and the cooling apparatus 4B is constituted only by the multiple stages of cooling gas blowing nozzles 12A to 12D. The optical fiber 3 running through the cooling gas blowing nozzles 12A to 12D is enclosed by the air flow flowing through these cooling gas blowing nozzles 12A to 12D. The blowing direction of the cooling air of the cooling gas blowing nozzle 12A at the topmost stage is set to the direction inclined exactly by the angle $\theta$ with respect to the running axial line of the optical fiber 3. The shape of the cooling gas blowing nozzles other than the cooling gas blowing nozzle 12A at the topmost stage, for example, the cooling gas blowing nozzle 12D, is the same shape as that of the gas blowing nozzles 12a to 12d illustrated in FIG. 3. Note, the center line of the cooling air blowing tubular portion 12A1 of the cooling gas blowing nozzle 12A at the topmost stage is inclined by exactly the angle $\theta$ with respect to the running axial line of the optical fiber 3. That is, the cooling gas blowing nozzle 12A has the same shape as that of the gas louver 15 shown in FIG. 7 and 15A shown in FIG. 8 and performs the same function as that of these gas louvers. Accordingly, this cooling apparatus 4B also makes it possible to prevent the cooling air blown out from the cooling gas blowing nozzle 12A from entering into the heating furnace 1 via the optical fiber exit 11 of the heating furnace. Also, since a part corresponding to the cooling tubular body 5A is unnecessary, the construction of this optical fiber production apparatus becomes simpler.

FIG. 12 is a view of a cross-section of a gas louver plate 25 as a modification of the gas louver 15A shown in FIG. 8. As the gas louver, a gas louver plate 25 is provided at the upper portion of the cooling tubular body 5. An optical fiber inlet 25A having an inner diameter for allowing the optical fiber 3 running at a high speed to pass therethrough without contact is made at the center of the gas louver plate 25. When the gas louver plate 25 is provided at the upper portion of the cooling tubular body 5, the majority of the cooling He gas or the cooling air blown out from the inlet of the optical fiber 3 of the cooling tubular body 5 does not pass through the optical fiber inlet 25A. Most or all of the cooling He gas blows in a direction indicated by an arrow along the bottom face of the gas louver plate 25. As a result, the cooling He gas blown out from the cooling tubular body 5 does not enter into the heating furnace 1 via the optical fiber exit 11 of the heating furnace. Accordingly, the lowering of the quality of the optical fiber 3 in the heating furnace 1 can be prevented.

In place of the gas louvers 15 and 15A shown in FIG. 6 and FIG. 8, FIG. 8 and FIG. 9, the gas louver plate 25 shown in FIG. 12 can be applied to the optical fiber production apparatus shown in FIG. 6 and the optical fiber production apparatus shown in FIG. 9, and in addition, can be applied also to the optical fiber production apparatuses mentioned later, for example, the optical fiber production apparatus shown in FIG. 13 and so on.

FIG. 13 is a structural view of an optical fiber production apparatus as a fourth embodiment of the optical fiber production apparatus of the present invention. This optical fiber production apparatus is obtained by applying the optical fiber production method of the present invention to the optical fiber production apparatus of a type not using gas blowing (cooling gas blowing) nozzles shown in FIG. 1 as the conventional example.

This optical fiber production apparatus is provided with a gas louver 15 having a construction shown in FIG. 7, the gas louver 15A shown in FIG. 9, or the gas louver plate 25 shown in FIG. 12. Note, in relation to the illustration, only the gas louver 15 is shown in FIG. 13. In the cooling tubular body 5, a fin 16 is integrally arranged along the inside circumference thereof. Also, in the cooling tubular body 5, a belt 17 rotating this cooling tubular body 5, a roller 18 rotating this belt 17, and a motor 29 rotating this roller 18 are provided. A cooling gas introduction port 8 is provided in the lower portion of the cooling tubular body 5. The He gas is introduced from this cooling gas introduction port 8 to the cooling tubular body 5. When the cooling tubular body 5 is rotated by the motor 29, the fin 16 inside the cooling tubular body 5 rotates together to move the He gas supplied from the gas introduction port 8 upward along the running axial direction of the optical fiber 3, whereby the cooling of the optical fiber 3 can be carried out more effectively.

That is, in this optical fiber production apparatus too, the direction of the He gas exhausted from the optical fiber inlet 19 is a direction inclined exactly by the angle $\theta$ with respect to the running axial line of the running optical fiber 3 by the gas louver 15, and therefore it is possible to prevent the He gas blown out from the optical fiber inlet 19 from entraining the air containing dust at the periphery of the cooling apparatus 4 and entering into the heating furnace 1 via the optical fiber exit 11 of the heating furnace, and thus the lowering of the quality of the optical fiber 3 can be prevented.

Figure 14:
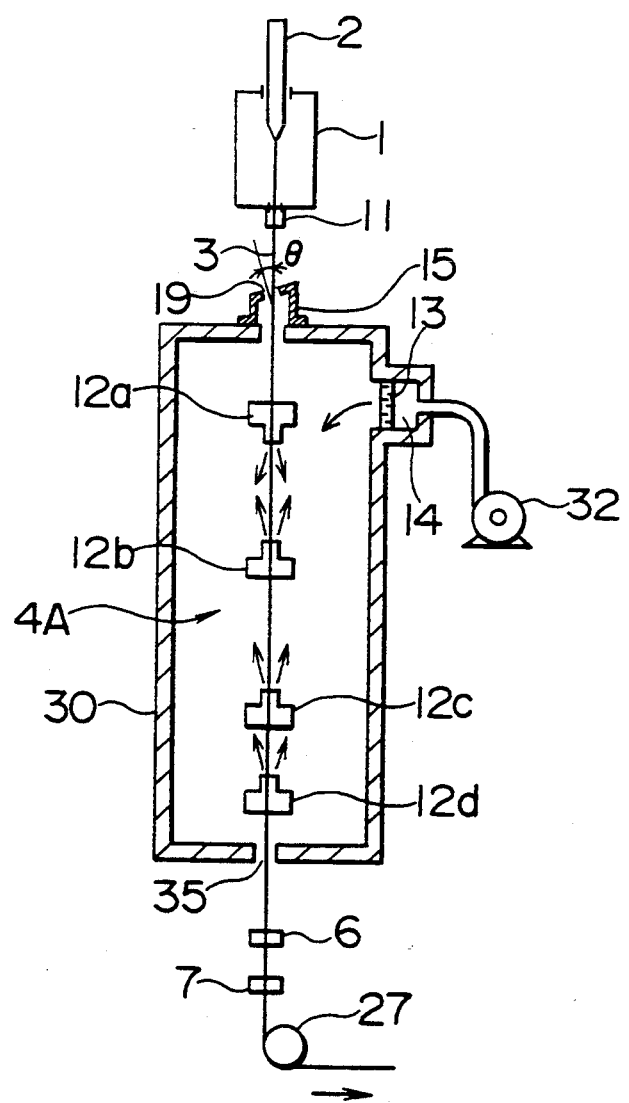
FIG. 14 is a structural view of an optical fiber production apparatus using air as the cooling gas as a fifth embodiment of the optical fiber production apparatus of the present invention.

FIG. 14 is a structural view of an optical fiber production apparatus using air as the cooling gas as a fifth embodiment of the optical fiber production apparatus of the present invention. This optical fiber production apparatus is provided, at the outside of the cooling apparatus 4A constituted by arranging a plurality of stages of gas blowing nozzles 12a to 12d, with a cooling apparatus container 30 which encloses the cooling apparatus 4A. A gas feed port (gas blowing port) 14 on which a filter 13 is mounted is provided at the upper portion of this cooling apparatus container 30. A blower 32 is connected to this gas blowing port 14, so that positive pressure forming air is sent into this, as the positive pressure forming gas. Note that, positive pressure means a positive pressure in the sense reverse to negative pressure and for increasing the internal pressure over the pressure of the environment of the outside air.

The gas blowing nozzles 12a to 12d have the construction illustrated in FIG. 3. That is, the gas blowing nozzles 12a to 12d are formed so that the cooling air is blown out via a gas holder 122 provided at the inside circumference of the center optical fiber penetration hole 121, through a slit 123 opening into the optical fiber penetration hole 121, and on to the optical fiber penetration hole 121. The cooling air is injected to the gas blowing nozzles 12a to 12d constituting the cooling apparatus 4A and cools the optical fiber 3 running through the center of these gas blowing nozzles 12a to 12d. In the gas blowing port 14, a filter 13 is provided for removing the dust in the positive pressure forming air blown out into the cooling apparatus container 30.

Note that, the cooling apparatus container 30, the top fiber penetration hole 19, and the bottom fiber penetration hole 35 in this embodiment correspond to the aforesaid cooling tubular body 5A, optical fiber inlet 9, and the optical fiber exit 10, respectively. Note, the cooling apparatus container 30 is constituted so that the cooling apparatus 4A has a positive pressure.

An explanation will next be made of the optical fiber production method in this optical fiber production apparatus. The positive pressure forming air cleaned of dust contained in the air by the filter 13 is supplied from the gas blowing port 14 into the cooling apparatus container 30. The cooling of the optical fiber 3 is carried out while the internal pressure of the cooling apparatus container 30 is held at a positive pressure with respect to the outside environment. For example, the differential pressure in the cooling apparatus container 30 with respect to the outside environment (surroundings) is held at 0.1 mmH$_2$O or more, and the force-cooling of the optical fiber 3 is carried out by the cooling air cleaned of dust and blown out from the gas blowing nozzles 12a to 12d. In this way, when the cooling of the optical fiber 3 is carried out by cooling air while holding the interior of the cooling apparatus container 30 at a positive pressure with respect to the outside environment by the positive pressure forming air from which dust has been removed, the dust in the outside environment is prevented from being entrained in the cooling air from which dust has been removed and blown out from the gas blowing nozzles 12a to 12d and thus from entering into the heating furnace, and therefore it is possible to lower the probability of breakage of the optical fiber 3 due to the contact with dust in the heating furnace 1. Also, the present embodiment has a construction such that the entire optical fiber production apparatus is not enclosed by a container, but just the cooling apparatus 4 is enclosed by the cooling apparatus container 30, and therefore the rise of the manufacturing cost of the optical fiber production apparatus can be reduced to the minimum level.

Note that, in this optical fiber production apparatus, to purge the dust in the cooling apparatus container 30, it is better if the flow is formed in the direction of gravity, and therefore the positive pressure forming air fed into the cooling apparatus container 30 is preferably supplied from the top of the cooling apparatus container 30 as illustrated. Also, it is better that the diameter of the bottom fiber penetration hole 35 of the cooling apparatus be made larger than the diameter of the top fiber penetration hole 19 of the cooling apparatus of the cooling apparatus container 30, to facilitate the flow of the positive pressure forming air from the top to the bottom.

According to experiments, the flow rate of the air for forming the positive pressure is suitably 1 to 2 m$^3$/min. To reduce the breakage rate of the optical fiber 3 to 0.01 break/km or less, a filter which can catch dust of a size of 0.3 μm is used as the filter 13. The air for forming the positive pressure may be dried or not dried.

Also, in this embodiment, the orientation of the optical fiber inlet 19 is one inclined exactly by the angle θ with respect to the running optical fiber 3. Here, the gas blowing nozzle 12a at the topmost stage is preferably oriented downward as illustrated in FIG. 14 so that the air is not blown out into the heating furnace 1.

An example of the production conditions of the above-described case will be shown in the following Table 1.

TABLE 1

| | |
|---|---|
| Cooling length of cooling apparatus 4A by gas blowing nozzles 12a to 12d: | 2 to 4 m |
| Drawing rate: | 400 to 600 m/min |
| Blowing amount of positive pressure forming air: | 1 to 2 m$^3$/min |
| Total air blowing amount from all gas blowing nozzles: | 100 l/min |

Experimental Findings

When the amount of dust having a particle size of 0.5 μm the cooling apparatus container 30 was reduced to 10$^3$ or less in ICF and the breakage rate of the optical fiber 3 was examined, it was seen that the breakage rate could be reduced to 0.01 break/km or less. Note that, if the air for forming the positive pressure to be supplied to the gas feed port 14 is preliminarily set at a lower temperature by a cooler, the cooling capability can be enhanced. For example, where the temperature of the positive pressure forming air is lowered from for example 20° C. by 20° C., that is, lowered to 0° C., a drawing rate of 600 m/min was the cooling limit at room temperature, but where the temperature was lowered exactly by 20° C., cooling became possible up to a drawing rate of 700 m/min.

Figure 15:
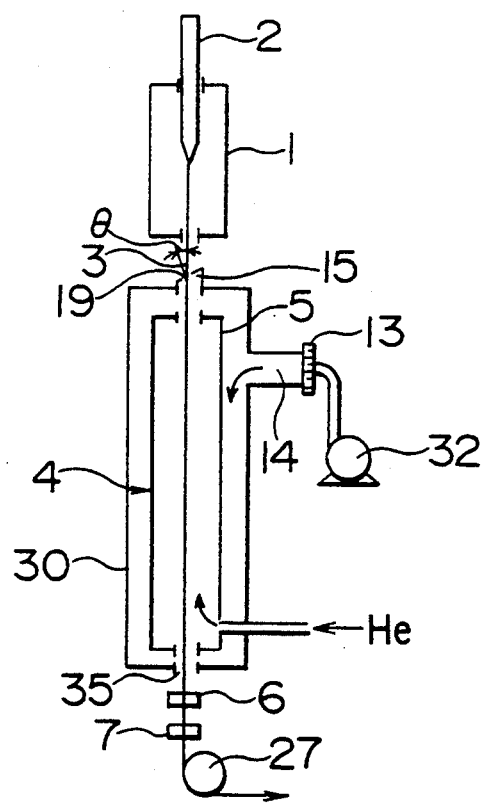
FIG. 15 is a structural view of an optical fiber production apparatus using He gas as the cooling gas as a sixth embodiment of the optical fiber production apparatus of the present invention.

FIG. 15 is a structural view of an optical fiber production apparatus using He gas as the cooling gas as a sixth embodiment of the optical fiber production apparatus of the present invention.

This optical fiber production apparatus is provided with a cooling apparatus container 30 further enclosing the cooling apparatus 4 having the cooling tubular body 5. Positive pressure forming air cleaned of dust by the filter 13 is fed into the cooling apparatus container 30 in the same way as with the optical fiber production apparatus shown in FIG. 14. The cooling of the optical fiber 3 is carried out by He gas in the cooling tubular body 5 while holding the inside of the cooling apparatus container 30 to a positive pressure with respect to the outside environment. In this optical fiber production apparatus too, a positive pressure is used, and therefore a similar effect to that of the optical fiber production apparatus shown in FIG. 14 can be obtained.

Figure 16:
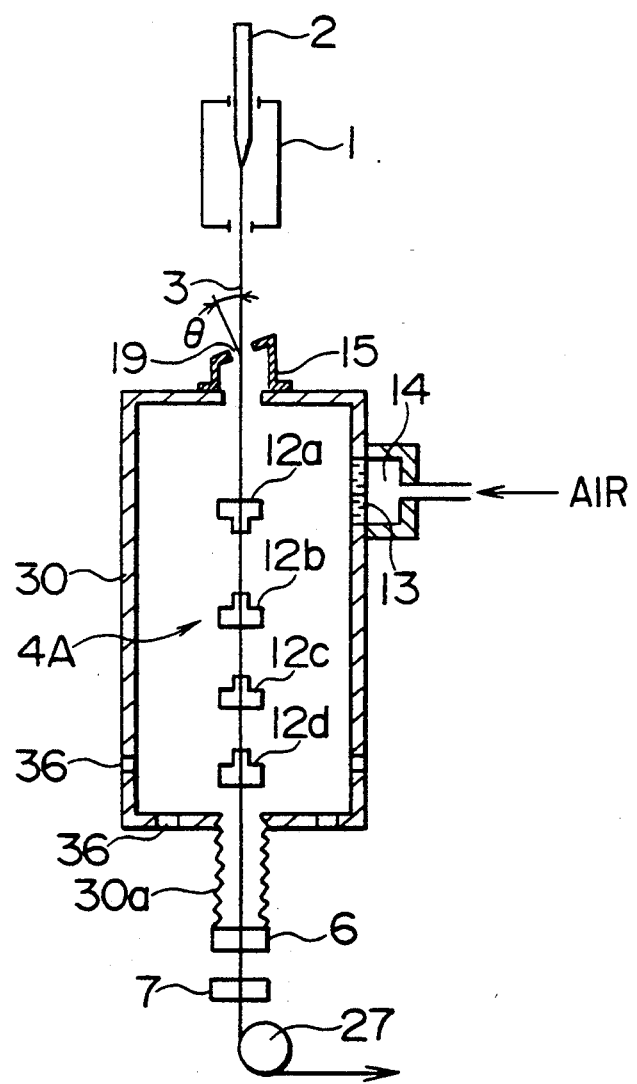
FIG. 16 and FIG. 17 are structural views of an optical fiber production apparatus as a seventh embodiment of the optical fiber production apparatus of the present invention.
Figure 17:
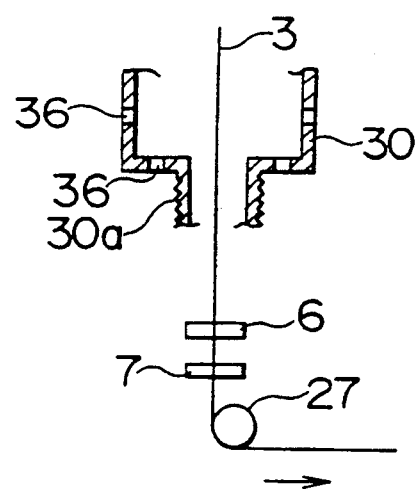

FIG. 16 and FIG. 17 are structural views of an optical fiber production apparatus as a seventh embodiment of the optical fiber production apparatus of the present invention. This optical fiber production apparatus is provided with a cooling apparatus container 30 which encloses the cooling apparatus 4A constituted by arranging a plurality of stages of gas blowing nozzles 12a to 12d and further encloses the interval from this cooling apparatus 4A to the resin coater 6 and a container extension 30a. That is, an expandable type container extension 30a at the bottom of the cooling apparatus container 30 is extended to the resin coater 6, to prevent the optical fiber 3 cooled by the cooling apparatus 4A from coming in contact with the outside air. In this way, when the container extension 30a is provided, it is possible to prevent contact with the dust in the outside environment during the period where the optical fiber 3 leaving of the cooling apparatus container 30 moves toward the resin coater 6, and thus the lowering of the breakage rate of the optical fiber 3 in parts other than the heating furnace 1 can be further improved.

The resin coater 6 is installed at the start of the drawing. Therefore, when the container extension 30a and the resin coater 6 are made integral, the work for installing the resin coater becomes difficult. Therefore, in this embodiment, as shown in FIG. 17, the container extension 30a is contracted so as not to obstruct the installation work of the resin coater 6. In this way, where a container extension 30a reaching the resin coater 6 is provided, to avoid the discharge of the gas to the resin coater 6 side, an exhaust port 36 is provided on the bottom side of the cooling apparatus container 30. Note that, the container extension 30a is not restricted to the expandable type as illustrated. It can have a construction wherein can be assembled and disassembled.

The above-mentioned embodiments can be appropriately combined. For example, although not shown due to restrictions in illustration, the gas louver 15 shown in FIG. 7, the gas louver 15A shown in FIG. 8, and the gas louver plate 25 shown in FIG. 12 can be provided at the top of the cooling tubular bodies 5 of the optical fiber production apparatuses shown in FIG. 14, FIG. 15, and FIG. 16. Also, the cooling apparatus container 30 and container extension 30a shown in FIG. 16 and FIG. 17 can be provided in the optical fiber production apparatuses shown in FIG. 6, FIG. 9, FIG. 13, FIG. 14, and FIG. 15.

Note that He gas was used as an example of the cooling gas introduced into the cooling tubular body 5, but another gas which has a cooling effect and does not exert an adverse influence upon the optical fiber 3 can be used as well.

Further, in the above-mentioned optical fiber production apparatus of the present invention, the cooling apparatus was mostly described and other parts were not described except the particularly relative areas, but the optical fiber production apparatus of the present invention is not restricted to the structure of the exemplified optical fiber production apparatus, and the present invention can be applied to various types of optical fiber production apparatuses to which the above-mentioned optical fiber cooling can be applied.

In the above description, a single mode optical fiber was used as an example of an optical fiber, but the optical fiber production apparatus and optical fiber production method of the present invention are not restricted to the single mode optical fiber and can be applied to the production of other various types of optical fibers.

As mentioned above, in the optical fiber production apparatus and optical fiber production method of the present invention, the blowing direction of the gas at the topmost portion of the cooling apparatus provided beneath the heating furnace was set be a direction inclined with respect to the axial line of the running optical fiber, and therefore it is possible to prevent the gas blown upward from the cooling apparatus from entering into the heating furnace. Accordingly, according to the optical fiber drawing method and the optical fiber production apparatus of the present invention, it is possible to suppress the lowering of the strength of the optical fiber which occurs by the adhesion of dust or the like to the optical fiber before the curing in the heating furnace, and drawing of the optical fiber with a good quality can be easily carried out.

Also, according to the present invention, it is possible to suppress the rising of the gas directly upward without the use of a rise suppression gas. Therefore, it is possible to prevent the useless consumption of gas.

Further, according to the present invention, a cooling apparatus container enclosing the cooling apparatus is provided, and the cooling of the optical fiber is carried out by the gas while holding the interior of the cooling apparatus container at a positive pressure with respect to the outside environment by a positive pressure forming air cleaned of dust, therefore the dust in the outside environment will not be entrained in the cooling gas, and it is possible to lower the breakage rate of the optical fiber due to the contact of dust. Particularly, in the present invention, the construction is such that the entire optical fiber production apparatus is not enclosed, but just the cooling apparatus is enclosed by the cooling apparatus container 30, and therefore the rise of the manufacturing cost of the optical fiber production apparatus can be minimized.

The working of the present invention is not restricted to the above-mentioned embodiments. A person skilled in the art can adopt various modifications within the scope of the attached claims.

What is claim is:

1. An optical fiber production apparatus comprising:
a heating furnace which heats an optical fiber preform and draws an optical fiber, through an exit in said furnace, comprising a core and a cladding;
a cooling apparatus having a first optical fiber penetration portion arranged below said heating furnace and receiving the optical fiber pulled out from said heating furnace, cooling means for force-cooling said received optical fiber by using a cooling gas, and a second optical fiber penetration portion from which the cooled optical fiber is pulled out; and resin coating means, which is arranged downstream of said cooling apparatus, for coating a protective resin on said optical fiber cooled and pulled out from said second optical fiber penetration portion,
wherein said first optical fiber penetration portion is provided with cooling gas louver means for directing said cooling gas blown out from said first optical fiber penetration portion at an angle from the running axis of the optical fiber, said angle being sufficient to direct the cooling gas away from the exit of said heating furnace to substantially prevent gas from entering the heating furnace.

2. An optical fiber production apparatus as set forth in claim 1, wherein said cooling gas louver means includes a hole with a size equivalent to that of said first optical fiber penetration hole positioned at the top of said cooling means, which hole is formed with an orientation different from that of the running axis of said optical fiber.

3. An optical fiber production apparatus as set forth in claim 2, wherein in said cooling gas louver means, a gas holder for storing said blown out cooling gas is provided between said first optical fiber penetration hole positioned at the top of said cooling means and the hole of said cooling gas louver means.

4. An optical fiber production apparatus as set forth in claim 2, wherein said cooling gas louver means includes:
a flange having a hole with substantially the same size as that of said first optical fiber penetration hole positioned at the top of said cooling means;
a tubular portion which is connected to said flange, has a larger inner diameter than the inner diameter of said flange, and defines the aforesaid gas holder; and
a nozzle member which is connected to said tubular portion, has a hole in the surface orthogonal to the running axis of the aforesaid optical fiber with a size equivalent to that of the hole at the top of the aforesaid cooling means, and is inclined at its surface exactly by the aforesaid predetermined angle with respect to the running axis of the aforesaid optical fiber.

5. An optical fiber production apparatus as set forth in claim 3, wherein said cooling gas louver means includes:
a flange having a hole with substantially the same size as that of said first optical fiber penetration hole positioned at the top of said cooling means;
a tubular portion which is connected to said flange, has a larger inner diameter than the inner diameter of said flange, and defines the aforesaid gas holder; and a nozzle member which is connected to said tubular portion, has a hole in the surface orthogonal to the running axis of the aforesaid optical fiber with a size equivalent to that of the hole at the top of the aforesaid cooling means, and is inclined at its surface exactly by the aforesaid predetermined angle with respect to the running axis of the aforesaid optical fiber.

6. An optical fiber production apparatus as set forth in claim 2, wherein said cooling gas louver means includes:
a flange having a hole with substantially the same size as that of said first optical fiber penetration hole positioned at the top of said cooling means;
a tubular portion which is connected to said flange, has a larger inner diameter than the inner diameter of said flange, and defines said gas holder; and
a tubular nozzle member which is connected to said tubular portion and is formed to have a tubular shape having a predetermined length, the direction of said tube being inclined exactly by said predetermined angle with respect to the running axis of said optical fiber, the hole of that tube being formed so as to have a size such that said optical fiber can run through the internal portion thereof.

7. An optical fiber production apparatus as set forth in claim 3, wherein said cooling gas louver means includes:
a flange having a hole with substantially the same size as that of said first optical fiber penetration hole positioned at the top of said cooling means;
a tubular portion which is connected to said flange, has a larger inner diameter than the inner diameter of said flange, and defines said gas holder; and
a tubular nozzle member which is connected to said tubular portion and is formed to have a tubular shape having a predetermined length, the direction of said tube being inclined exactly by said predetermined angle with respect to the running axis of said optical fiber, the hole of that tube being formed so as to have a size such that said optical fiber can run through the internal portion thereof.

8. An optical fiber production apparatus as set forth in claim 2, wherein in said cooling gas louver means, a hole having a size large enough to allow said optical fiber to pass therethrough is formed, a plate-like member which is provided at the top of said cooling means inclined exactly by the predetermined angle with respect to the running axis of said optical fiber is provided, and said blown out cooling gas is oriented along the bottom surface of said plate-like member.

9. An optical fiber production apparatus as set forth in claim 2, wherein said cooling means is constituted so as to have a tubular shape having an inner cavity through which said optical fiber can run and in constituted so that said cooling gas is blown from the lower portion to the upper portion in said inner cavity, the top portion of the inner cavity of said cooling means corresponding to said first optical fiber penetration hole, and
wherein said cooling gas louver means has a hole having a size equivalent to that of said first optical fiber penetration hole corresponding to the top of the inner cavity of the aforesaid cooling means, said hole being formed with an orientation different from that of the running axis of said optical fiber.

10. An optical fiber production apparatus as set forth in claim 2, wherein said cooling means is constituted so as to have a tubular shape having an inner cavity through which said optical fiber can run and in constituted so that said cooling gas is blown from the lower portion to the upper portion in said inner cavity, the top portion of the inner cavity of said cooling means corresponding to said first optical fiber penetration hole, and
wherein said cooling gas louver means has a hole having a size equivalent to that of said first optical fiber penetration hole corresponding to the top of the inner cavity of the aforesaid cooling means, said hole being formed with an orientation different from that of the running axis of said optical fiber.

11. An optical fiber production apparatus as set forth in claim 9, wherein said cooling apparatus includes:
a fin which is arranged in said cooling means spirally along the running axis of the optical fiber at the periphery of the running axis of the optical fiber;
a cooling means which accommodates said fin; and
a means for rotating said cooling means.

12. An optical fiber production apparatus as set forth in claim 9, wherein said cooling apparatus (4) includes:
a cooling means container which encloses said cooling means and has optical fiber penetration holes with substantially the same diameter as that of the two ends of the inner cavity of said cooling means corresponding to said two ends and
a gas injection means which injects gas of a positive pressure into a space between said cooling apparatus means container and said cooling means.

13. An optical fiber production apparatus as set forth in claim 12, wherein the gas injected by said gas injection means is air in the ambient atmosphere, and
wherein said gas injection means has a filter for cleaning said air.

14. An optical fiber production apparatus as set forth in claim 9, wherein said cooling gas is a gas having a high heat diffusion capability, for example, He gas.

15. An optical fiber production apparatus as set forth in claim 2, wherein said cooling means has a plurality of cooling gas blowing nozzles arranged in multiple stages along the running axis of the optical fiber, said optical fiber being passed through the centers of the same, and cooling gas being blown through them so as to cool said optical fiber at the stage of the fiber passing the same.

16. An optical fiber production apparatus as set forth in claim 3, wherein said cooling means has a plurality of cooling gas blowing nozzles arranged in multiple stages along the running axis of the optical fiber, said optical fiber being passed through the centers of the same, and cooling gas being blown through them so as to cool said optical fiber at the stage of the fiber passing the same.

17. An optical fiber production apparatus as set forth in claim 15, wherein among said plurality of stages of gas blowing nozzles, the blowing orientation of the cooling gas blowing nozzle in the vicinity of said first optical fiber penetration hole is set inverse to the orientation of said first optical fiber penetration hole, and the blowing orientation of the other cooling gas blowing nozzles is set inverse to the orientation of the running of said optical fiber,
wherein said cooling apparatus includes
a cooling container which accommodates said gas blowing nozzles, has said first optical fiber penetration hole formed at the top thereof, and has said second optical fiber penetration hole formed at the bottom thereof, and
an air sealing means which seals clean air from the upper portion of said cooling container into said cooling container, and wherein said cooling gas louver means is provided at the area of said first optical fiber penetration hole.

18. An optical fiber production apparatus as set forth in claim 15, wherein the blowing orientation of said plurality of stages of cooling gas blowing nozzles is set to be inverse to the orientation of the running of said optical fiber, and among these cooling gas blowing nozzles, the blowing orientation of the gas blowing nozzle in the vicinity of said first optical fiber penetration hole is one inclined exactly by a predetermined angle with respect to the running axis of the optical fiber.

19. An optical fiber production apparatus as set forth in claim 15, wherein said cooling apparatus includes:
   a cooling apparatus container which encloses a plurality of cooling gas blowing nozzles and has optical fiber penetration holes at the top and bottom thereof, and
   a gas injection means which injects gas of a positive pressure into a space between said cooling apparatus means container and said cooling means.

20. An optical fiber production apparatus as set forth in claim 19, wherein the gas injected by said gas injection means is air in the ambient atmosphere, and
   said gas injection means has a filter for cleaning said air.

21. An optical fiber production apparatus as set forth in claim 1, wherein a sealing means which seals off the running part of said optical fiber from the outside air is provided between the lower end of said cooling apparatus and said resin coating means.

22. An optical fiber production apparatus as set forth in claim 21, wherein said sealing means is constituted by an expandable material.

23. An optical fiber production method drawing an optical fiber from an optical fiber preform in a heating furnace having an exit, cooling the obtained optical fiber by a cooling apparatus provided beneath said heating furnace, and then coating a resin on the outer circumference of said optical fiber by a resin coating device, wherein the cooling gas blowing orientation of an optical fiber penetration hole formed at the top of said cooling apparatus is set to an angle different from that of the running axial line of said optical fiber to direct the cooling gas that exhausts from the penetration hole away from the exit of the heating furnace to substantially prevent gas from entering said furnace.

24. An optical fiber production method as set forth in claim 23, wherein the cooling of said optical fiber is carried out by said cooling gas while holding the periphery of said cooling apparatus at a positive pressure with respect to the outside environment by a positive pressure forming gas from which dust has been removed.

25. An optical fiber production method as set forth in claim 24, wherein a cooling apparatus container for enclosing said cooling apparatus is provided, and
   wherein said positive pressure forming gas is sealed in said cooling apparatus container.

26. An optical fiber production method as set forth in claim 23, wherein the space between said cooling apparatus and said resin coating device is sealed off from the outside air.

* * * * *

UNITED STATES PATENT AND TRADEMARK OFFICE
CERTIFICATE OF CORRECTION

PATENT NO. : 5,383,946
DATED : January 24, 1995
INVENTOR(S) : Naka et al.

It is certified that error appears in the above-indentified patent and that said Letters Patent is hereby corrected as shown below:

```
Column 1, line 20, after "125μm" insert --on--.
Column 2, line 59, "1/min" should be --ℓ/min--.
Column 3, line 5,  "1/min" should be --ℓ/min--.
Column 3, line 23, "1/min" should be --ℓ/min--.
Column 3, line 32, "1/min" should be --ℓ/min--.
Column 3, line 50, "1/min" should be --ℓ/min--.
Column 3, line 63, "&A" should be --4A--.
```

UNITED STATES PATENT AND TRADEMARK OFFICE
CERTIFICATE OF CORRECTION

PATENT NO. : 5,383,946

DATED : January 24, 1995

INVENTOR(S) : Naka et al.

It is certified that error appears in the above-indentified patent and that said Letters Patent is hereby corrected as shown below:

```
Column 4, line 29, "i" should be --1--.
Column 4, line 30, "i" should be --1--.
Column 4, line 39, "1/min" should be --ℓ/min--.
Column 4, line 43, "i" should be --1--.
Column 4, line 56, "i" should be --1--.
* Column 5, line 51, "a" should be --as--.
* Column 7, line 54, after "set" insert --to--.
Column 9, line 61, "FIG. I" should be --FIG. 1--.
Column 10, line 41, "1/min" should be --ℓ/min--.
* Column 12, line 7, delete "a" (first occurrence).
Column 12, line 12, "1/min" should be --ℓ/min--.
Column 12, line 22, "i" should be --1--.
* Column 12, line 47, delete "in" (first occurrence).
```

Signed and Sealed this

Twenty-seventh Day of August, 1996

Attest:

BRUCE LEHMAN

Attesting Officer  Commissioner of Patents and Trademarks